United States Patent [11] 3,630,753

[72] Inventors Paul Melnychyn
 Northridge;
 John M. Wolcott, Burbank, both of Calif.
[21] Appl. No. 741,866
[22] Filed July 2, 1968
[45] Patented Dec. 28, 1971
[73] Assignee Carnation Company
 Los Angeles, Calif.

[54] METHOD OF PRODUCING AN EDIBLE SOY PROTEIN HAVING REDUCED VISCOSITY
 19 Claims, No Drawings
[52] U.S. Cl. .......................................................... 99/17
[51] Int. Cl. .......................................................... A23j 1/14
[50] Field of Search .............................................. 99/17, 14, 98, 64; 260/123.5

[56] References Cited
 UNITED STATES PATENTS
 2,329,445 9/1943 Turner et al. ................... 260/123.5
 3,168,406 2/1965 Mosby ............................ 99/99
 3,268,503 8/1966 Mustakas ....................... 260/123.5
 3,468,669 9/1969 Boyer et al. .................... 99/17
 OTHER REFERENCES
 Klare Markley, Soybeans and Soybean Products, Vol. I, Interscience Publishers Inc., New York, 1950, pp. 336– 338
 John V. Ziemba, " Let Soy Proteins Work Wonders for You," Food Engineering, May 1966, Vol. 38, No. 5, pp. 82– 84, 87– 90, and 93

Primary Examiner—A. Louis Monacell
Assistant Examiner—William Andrew Simons
Attorneys—Eugene C. Ziehm and Robert D. Kummel ABSTRACT: The present invention relates to a method of controllably decreasing the viscosity of soy protein in aqueous dispersion. The method includes treating soy protein in the dispersion with a selected treating agent at selected temperature and for a time sufficient to effect a desired viscosity reduction without substantial hydrolysis of the soy protein. Thereafter, the protein is separated from the treating agent. Such treating agent may comprise any one or more of such agents as halogens, inorganic salts containing both halogen and oxygen atoms, soluble inorganic persulfates, azodiamides, thiol-containing reducing agents. As one embodiment of the invention, soy protein after treatment with the treating agent is contacted with an odor-and-flavor-improving agent selected from the group consisting of aliphatic mono- and polyhydroxy alcohols, ethers and ketones and mixtures thereof for a time and at a temperature and concentration sufficient to improve substantially the odor and flavor thereof. Such contact is effected by first precipitating the soy protein at about its isoelectric point, i.e., about pH 4.5 and then washing the precipitate with the improving agent. In another embodiment an aqueous dispersion containing the treated soy protein is mixed with the improving agent.

METHOD OF PRODUCING AN EDIBLE SOY PROTEIN HAVING REDUCED VISCOSITY

Soy protein currently is being investigated extensively because of its possibilities as an economical source of protein for human nutrition. Thus, soy protein isolates have been added to various human food formulations. However, soy protein isolates have a characteristic "beany" odor and flavor which is objectionable in human foods. Accordingly, heretofore when successfully used in human food formulations such isolates have been masked in odor and flavor by other ingredients in the formulations and/or have been used in such small concentrations as not to impart much flavor and odor to the formulations. It will be understood that if soy protein is to be extensively utilized in the future for human food formulations, it will have to become available in a bland form acceptable both in flavor and in odor to the average consumer.

A present further restriction on the use of most commercial soy protein isolates is that many are not wholly soluble in aqueous systems and, even if soluble, commercial isolates exhibit relatively high viscosity in such aqueous systems. Accordingly, even though it would be desirable to use soy protein as a complete substitute, weight for weight, for example, for casein in an ersatz milk formulation calling for about 3.5 wt. percent casein, commercial soy protein isolates even if completely water soluble would cause the resulting milk product to have a viscosity which would exceed the normal viscosity of milk. Excessive "loading" of the milk would occur, due to the high viscosity imparted to the system by the soy protein. Moreover, the beany odor and flavor of the soy protein at a 3.5 wt. percent level would be wholly unsatisfactory. There are many other instances involving liquid human food systems where the flavor and odor, and also the viscosity imparted by conventional soy protein isolates are so great as to preclude their use in optimal concentrations nutritionally. The applicability of soy protein as a potentially large nutritional source in animal foods, including pet foods, will be obvious.

Thus, it would be desirable to provide a method of controllably decreasing the viscosity of soy protein and of improving its odor and flavor so as to increase its utility in human and animal foods.

Accordingly, it is a primary object of the present invention to provide a method of decreasing the viscosity of soy protein.

It is also an object of the present invention to provide a method of improving the odor and flavor of soy protein.

It is further object of the present invention to provide a simple, effective, rapid and economical method for controllably decreasing the viscosity of soy protein dispersed in an aqueous medium and to provide the resulting product in commercially acceptable form for human food use.

It is also an object of the present invention to provide a simple effective, rapid and economical method for improving the flavor and odor of soy protein, and to provide the product of the method.

Further objects and advantages of the present invention will be apparent from a study of the following detailed description.

The present method comprises treating an aqueous dispersion of soy protein with selected treating agent to reduce the viscosity of the soy protein to a controllable extent. This treatment also reduces the characteristic beany odor and flavor of the soy protein to some extent. The soy protein may thereafter be recovered as such, or may be subjected to further treatment utilizing another type of agent which reduces the "beany" odor and flavor of the soy protein to a marked extent. It will be understood that although the first above-mentioned treatment results in some improvement of the soy protein odor and flavor properties, its main effect is to reduce viscosity and that the flavor and odor properties of the protein are largely improved by the described supplemental treatment or second step of the present method. Such supplemental treatment somewhat increases the viscosity of the soy protein, but only to a level which is usually somewhat less than that exhibited by the soy protein before the initial treatment. Accordingly, the particular overall method applied within the scope of the present invention can be regulated to either largely decrease viscosity and somewhat improve odor and flavor of the soy protein, or to greatly improve its odor and flavor while either reducing or holding the viscosity thereof about constant.

Now referring more particularly to the steps of the present method, an aqueous soy protein dispersion is treated with a selected viscosity-decreasing agent. The aqueous soy protein dispersion is one obtained by alkaline extraction of soy protein from a suitable soy protein source, such as soy flakes previously defatted, for example by hexane extraction in a conventional manner to remove soy bean oil. Defatted soy bean meal or the like can also be used as the starting material. Alkaline extraction conditions are mild and rapid, with low temperature and short time being employed to avoid substantial hydrolysis of the soy protein. The soy protein source, for example defatted soy bean flakes, particulated sufficiently, e.g., 60 mesh, to assure adequate contact with the alkaline aqueous extracting medium, is dispersed in a suitable quantity of water and alkalizing agent, for example, sodium hydroxide, sodium carbonate, trisodium phosphate, calcium hydroxide, ammonium hydroxide or the like. The concentration of the alkalizing agent should be such as to permit alkaline extraction to proceed at a pH of about 9.5–12.5. For example, trisodium phosphate is usually utilized in a concentration of about 0.2–0.8 N. Calcium hydroxide concentrations of about 0.06–0.04 M are suitable, while 0.06–0.2 M concentrations of ammonium hydroxide have been used and 0.1–0.2 M concentrations of tributylamine, and 0.7 M or greater concentrations of sodium hydroxide. Any suitable ratio of soy protein source to alkalizing agent and water can be used. Generally speaking, slurries of about 1 to 3 or 1 to 4 weight-to-volume ratio of soy protein source to aqueous alkaline medium are used, although ratios of 1:10 and higher concentrations of aqueous alkaline medium have been used successfully.

There is no necessity of using a high temperature to carry out the soy protein aqueous alkaline extraction. Instead, the temperature is usually kept below 100° F. and preferably at about room temperature (70°–75° F.). During the initial stages of alkaline extraction, the pH of the slurry is about 9.5–12.5, but preferably not above about 11.7–12.2. Stirring is advocated, in order to increase contact of the protein source with the extracting agent and thus reduce required treating time.

After the extraction is under way and preferably substantially completed, for example, in about 1 minute, the treating agent may be added directly to the slurry. There is no necessity to separate the extraction medium from the protein source before treating with the treating agent, although this protein source-separating step can be carried out if desired. It will be understood that the extraction step can be eliminated through the use of previously alkaline extracted soy protein as starting material. It will be further understood that, if desired, the treating agent can be added to the extracting medium before contact with the soy bean source so that alkaline extraction and viscosity reduction can take place simultaneously over the entire extraction time.

The treating agent comprises an agent capable of effectively decreasing the viscosity of soy protein when dispersed in an aqueous medium. As such, the treating agent exhibits at least some solubility in water. It can be an inorganic salt containing both halogen and oxygen atoms, for example, potassium iodate, sodium chlorate, sodium chlorite, potassium bromate or the like, or can be a halogen e.g., chlorine or bromine. It can also be a suitable inorganic persulfate, such as sodium persulfate, ammonium persulfate or the like. The treating agent can be an azodiamide, for example, azodicarbonamide, or an active sulfhydryl-bearing reagent, such as dithiothreitol, mercaptoethanol or cysteine, capable of reacting with disulfide linkages in soy protein. The treating agent in whatever manner and of what type it is employed can be present in any suitable concentration sufficient to essentially completely react with the extracted soy protein in the aqueous medium to provide the desired results. For most purposes, the concentration of treating agent can be very small, for example, about $1.4 \times 10^{-3}$ M or the like. Greater concentrations can be used, if desired. A typical concentration when chlorine is used as the treating agent is about 0.1–0.3 percent, preferably 0.1 percent, by weight of the protein source (flakes, meal or the like). The most desirable concentration for the treating agent will depend on the concentration of the protein source, the particular treating agent selected, and the temperature and time to be employed in the viscosity-reducing reaction. The upper limit of treating agent concentration should be below that which could impart an undesirable residual flavor and odor to the soy protein.

The time, pH and temperature conditions for the alkaline extraction of the soy protein are as previously specified. However, it should be noted that when the treating step utilizing the treating agent of the present method is carried out, another set of conditions preferably is employed. Accordingly, such treating step preferably is carried out at a temperature of about 160°–180° F., most preferably about 170° F., although temperatures from room temperature to the boiling point can be utilized. This high temperature necessitates maintaining the pH of the aqueous medium at not substantially in excess of about pH 10.5 in order to avoid hydrolysis of the soy protein and development of sulfurous odors in the extract. Optimum pH is about 8.5. The treating step can be relatively short, for example, 1 minute, preferably with stirring, or can be extended up to 10 minutes or more. The time-temperature relationship is balanced to avoid substantial hydrolysis of the soy protein while still permitting complete reaction between the treating agent and soy protein. The soy protein source ratio to water may be, for example, 1:10. If alkaline extraction and the treating step are to be carried out simultaneously, it is preferred to employ the treating step conditions just mentioned, rather than the previously described extraction conditions. Thereafter, the treated soy protein can be precipitated, washed and converted to its final form, ready for use, or can be subjected to further treatment, as by contacting it in the flavor and odor improving supplemental step of the present method.

The flavor and odor-improving step employs an improving agent selected from the group consisting of water-soluble aliphatic mono- and di-hydroxy alcohols, aliphatic ethers, aliphatic ketones and mixtures thereof. Suitable non-limiting examples of mono-hydroxy alcohols are ethanol, isopropanol, n-butanol and the like. Suitable poly-hydroxy alcohols include glycerol, ethylene glycol and propylene glycol. Typical aliphatic ethers are methyl ethyl ether, di-N-propyl ether and diethylene glycol monomethyl ether, while suitable aliphatic ketones include dimethyl ketone, methyl ethyl ketone and diethyl ketone. In the flavor-and-odor-improving supplemental step, the treated soy protein, usually in aqueous dispersion, contacts the flavor-and-odor-improving agent, the latter usually, although not necessarily, being in a concentration of about 25–90 percent of the total volume of the mixture. Other suitable concentrations can be used.

It will be understood that the soy protein utilized in the flavor-and-odor-reducing step can be in the form of a precipitate obtained by adjusting the pH of the aqueous dispersion containing the soy protein from the treating step to about the isoelectric point of the soy protein, i.e., about pH 4.5 with a suitable acid, e.g., HCl. If desired, the precipitate can be water washed or the like, before the flavor-and-odor-improving step is carried out. Alternatively, the soy protein may still be in aqueous dispersion as a result of the treating step and can be used in that form in the flavor-and-odor-improving step either at neutral or alkaline pH. When the soy protein is contacted with the flavor-and-odor-improving agent in aqueous dispersion, it is precipitated, if not already in that form. Accordingly, the previously described precipitation and isolation need not be carried out prior to contacting in the flavor-and-odor-improving step. It is preferred that the treated soy protein be added to the flavor-and-odor-improving agent, so that the precipitation of the soy protein can be observed carefully. So long as it continues with fresh additions of the treated soy protein to the indicated agent, sufficient agent is present to accomplish the desired flavor and odor improvement. This step can be carried out at any temperature below the boiling point of the improving agent, but preferably not substantially in excess of 100° F., most preferably at about room temperature, and for a short period of time, for example 1–30 minutes with stirring, preferably about 5 minutes. Elevated temperatures decrease the solubility of the soy protein and increase its viscosity substantially more than room temperature treatment, and do not provide flavor and odor enhancement over that afforded at room temperature. Particular techniques in accordance with the present method are exemplified in the following example:

EXAMPLE

Commercially available soy bean flakes, previously defatted by conventional hexane extraction, were ground to about 60 mesh and were then immersed in water at a 1:10 ratio of the flake weight-to-water volume. The water contained sufficient sodium hydroxide to provide a pH of about 8.5 and also contained, except in the case of controls, a suitable concentration of treating agent previously added to the alkaline water. Alkaline extraction of the soy protein and simultaneous viscosity reduction of the extracted soy protein were carried out over a period of 5 minutes at 170° F., after which the resulting dispersion was centrifuged at 4,000× gravity for 5 minutes, the temperature dropping during the centrifugation to 100° F. The clarified supernatant was decanted and the soy protein in the decanted supernatant was precipitated at 100° F. by addition of hydrochloric acid until the pH of 4.5 was reached and a protein precipitate was formed. The soy protein precipitate was then separated and recovered by centrifuging it at 4,000× gravity for 5 minutes. This precipitate was then washed in water, centrifuged to separate it and then dissolved in water at pH 7.0, frozen and lyophilized to obtain a dry powder for viscosity determinations.

However, in those instances in which the soy protein was subjected to subsequent treatment to improve the odor and flavor, the previously described protein precipitate (at pH 4.5) was dispersed in a quantity of improving agent at 70° F., with stirring, to provide a concentration of the improving agent of about 25 to 90 percent by volume. The protein remained in contact with the improving agent for 5 minutes, after which a 5 minute centrifugation at 4,000× gravity was carried out, the supernatant was decanted, the resulting soy protein precipitate was water-washed, recentrifuged, separated and then dissolved in water at pH 7.0, frozen and freeze dried.

The lyophilized product, whether or not it had been subjected to the treating agent and/or the improving agent, was then pulverized in a Waring blender to a uniform particle size and then dissolved in a predetermined amount of water to provide a specific protein concentration for viscosity measurements. Solution of the protein was accomplished by mechanical stirring for 15 minutes, followed by homogenization at 1,500 p.s.i. and 75° F. Immediately thereafter, viscosity measurements were made on each aliquot at 75° F. utilizing a Brookfield viscometer. After initial readings, dilutions with measured amounts of water were carried out in order to obtain viscosity readings at more dilute protein concentrations.

Typical test results utilizing the above-indicated procedure are set forth in the table below:

TABLE

| Treating agent | Flavor and odor improving agent | Protein concentration, percent | Viscosity in centipoises |
|---|---|---|---|
| Alkaline extracted control (no treating agent). | None | 2 | 20 |
| | | 4 | 90 |
| | | 6 | 560 |
| | | 8 | 1,820 |
| Alkaline extracted (no treating agent). | 86% ethanol | 2 | 35 |
| | | 4 | 250 |
| | | 6 | 2,300+ |

—Continued

| | | | |
|---|---|---|---|
| Chlorine 1.4×10⁻³ M | None | 2 | 5 |
| | | 4 | 10 |
| | | 6 | 20 |
| | | 8 | 70 |
| | | 10 | 350 |
| Do | 86% ethanol | 2 | 10 |
| | | 4 | 20 |
| | | 6 | 40 |
| | | 8 | 480 |
| Do | 80% isopropanol | 2 | 10 |
| | | 4 | 20 |
| | | 6 | 125 |
| | | 8 | 890 |
| Chlorine 7×10⁻³ M | 86% ethanol | 2 | 5 |
| | | 4 | 15 |
| | | 6 | 100 |
| | | 8 | 730 |
| Chlorine 1.4×10⁻² M | do | 2 | 5 |
| | | 4 | 15 |
| | | 6 | 85 |
| | | 8 | 650 |
| Ammonium persulfate 1.4×10⁻³ M | do | 2 | 10 |
| | | 4 | 20 |
| | | 6 | 75 |
| | | 8 | 570 |
| Sodium iodate 1.4×10⁻³ M | None | 2 | 5 |
| | | 4 | 10 |
| | | 6 | 30 |
| | | 8 | 110 |
| | | 10 | 840 |
| Potassium bromate 1.4×10⁻³ M | do | 2 | 5 |
| | | 4 | 10 |
| | | 6 | 30 |
| | | 8 | 85 |
| | | 10 | 375 |
| Sodium chlorate 1.4×10⁻³ M | do | 8 | 265 |
| Bromine 1.4×10⁻³ M | do | 8 | 195 |
| Azodicarbonamide 1.4×10⁻³ M | do | ≃7 | 18 |
| Dithiothreitol 1.4×10⁻³ M | do | ≃7 | 7.3 |
| Sodium chlorite 1.4×10⁻³ M | do | ≃7 | 22.6 |

In all of the tests reported in the table set forth above, the soy protein product obtained after the treating step and also that product obtained after the odor and flavor improving (where both steps were used) had a substantially reduced viscosity in contrast to a control which was merely alkaline extracted, this viscosity being evident over a wide range of concentrations of the soy protein in water. Although the treating agents varied somewhat in their relative effects on viscosity reduction, they were all effective even when used in very small concentrations. In those tests where the soy protein was only subjected to the flavor and odor-improving agent, the viscosity was slightly increased over that of the control.

Parallel tests were performed utilizing sodium persulfate and mercaptoethanol as treating agents, with and without subsequent treatment utilizing methanol, n-butanol, n-propanol, diethyl ether, methyl isopropyl ether, diethyl ketone and methylethyl ketone as odor-and-flavor-improving agents. Viscosity results were obtained which were comparable to those utilizing the treating agents and the flavor-and-odor-improving agents set forth in the table above.

In separate tests it was shown that the effective concentration of the treating agent can be as small as $1.4 \times 10^{-3}$ M to 10 times that level, or more, in fact up to that concentration which leaves a residual flavor or odor in the product. It was also shown that the flavor-and-odor-improving agent could be used in an effective concentration of from about 20 to 90 percent, by volume. This does not preclude the use of other concentrations for such improving agent.

Tests conducted in accordance with the above procedure established that when both the treating agent and flavor-and-odor-improving agent are utilized, the water solubility of the soy protein remains high, as is the case when only the treating agent is used. However, when only the odor and flavor improving agent is used, the solubility of the soy protein decreases to a substantial extent. For example, utilizing chlorine at $1.4 \times 10^{-3}$ M and 86 percent ethanol, soy protein which was 96 percent soluble in water was obtained. When ammonium persulfate at $1.4 \times 10^{-3}$ M was used along with 86 percent ethanol, the soy protein product was 95 percent water soluble. When chlorine at $1.4 \times 10^{-3}$ M and 80 percent isopropanol were used, the soy protein product was 93 percent water soluble. When chlorine at $1.4 \times 10^{-3}$ was used with no subsequent treatment employing a flavor-and-odor-improving agent, the soy protein product was 100 percent soluble. This was also the case with controls employing only alkaline extraction. When no treating agent was used, but instead merely a flavor-and-odor-improving agent, in this case 86 percent ethanol, the water solubility of the soy protein decreased to 62 percent.

Although some reduction in the beany odor and flavor of the soy protein was obtained through the use of the treating agent, in contrast to controls, in the present method, substantially greater reductions were obtained when the treating step was followed by the described flavor-and-odor-improving step. The flavor-and-odor-improving agents could be used in a wide range of concentrations, and all tested were effective in removing the beany flavor and odor from the soy protein. However, residual concentrations of selected improving agents required subsequent treatment, as by spray drying, etc., for their own removal from the soy protein product for acceptability for commercial food use. The resultant protein product of the invention which had been treated with both the treating and improving agent exhibited a great improvement in flavor and odor, with respect to the protein in contrast to untreated controls. This product was found to be particularly suitable for use in human food formulations where a minimal amount of the characteristic beany odor and flavor of soy protein can be tolerated, e.g. where other ingredients in the food formulation do not successfully mask such odor and flavor. It will be obvious that this soy protein in liquid or solid form is therefore particularly desirable for a number of human food uses, including bland cereal formulations, bland meat substitute formulations, ersatz milk and the like. It can also be used for a wide variety of other nutritional purposes, providing a source of bland nutritious soy protein in readily useable form.

The soy protein product of the invention obtained after the treating step is particularly suitable in formulating liquid foods, such as ersatz milk because of its very low viscosity and high water solubility, as well as improved flavor and odor. Accordingly, it can be used in place of the casein normally present in milk in the preparation of milk-type products, for example, infant feeding formulations, ersatz milk and the like. This soy protein is nutritious and because of its physical characteristics can effectively be used in other dairy-type human and animal food products, in meat substitutes, as an additive or ingredient in cereal and bakery commodities and in a wide variety of other applications.

Accordingly, an improved simplified economical method has been provided for the recovery of soy protein in a form which is highly useful for human and animal food formulations. The soy protein product of the invention is characterized by a low viscosity and/or markedly reduced beany odor and flavor. Such product is obtained efficiently in high yield and in a highly water soluble form and can be used either in the liquid or dry state. The present method can be employed simultaneously, if desired, with alkaline extraction of the soy protein from a suitable source, so that the cost of the method can be kept relatively low. Further objects and advantages of the present invention are as set forth in the foregoing. The present method, all embodiments thereof, its steps and parameters and the products thereof as are within the scope of the appended claims form a part of the present invention.

What is claimed is:
1. A method of providing an improved edible soy protein having reduced viscosity which method comprises
    contacting defatted soy protein in at least a dispersed phase in an aqueous medium with a treating agent selected from the group consisting of halogens, inorganic salts contain- ing both halogen and oxygen atoms, inorganic persulfates, azodiamides and sulfhydryl-bearing reagents capable of reacting with disulfide linkages in soy protein for a period of time and at a temperature sufficient to reduce the viscosity of the soy protein without substantial hydrolysis of said protein, the concentration of said treating agent in the aqueous medium being sufficient to reduce the viscosity of the soy protein without imparting an undesirable residual flavor and odor to said protein, and recovering from said aqueous medium, soy protein having a viscosity less than that of conventional aqueous alkaline extracted soy protein.

2. The method defined in claim 1 in which the aqueous medium is at a temperature of between about 160°–180° F. and a pH of not above about 10.5.

3. The method defined in claim 1 in which the treating agent is in contact with the soy protein in said aqueous medium for a period of time of up to about 10 minutes.

4. The method defined in claim 1 in which said concentration of treating agent is no more than about $1.4 \times 10^{-3}$ M.

5. The method defined in claim 1 in which the treating agent is chlorine and is present in the aqueous medium in an amount of between 0.1–0.3 percent by weight of said soy protein.

6. The method defined in claim 1 in which a source of defatted soy protein is introduced into an aqueous alkaline medium containing said treating agent whereby said reduction in viscosity of said soy protein is effected substantially simultaneously with extraction of protein in the aqueous medium from said protein source.

7. The method defined in claim 6 in which the aqueous medium is at a temperature of between about 160°–180° F. and a pH of not more than about 10.5 when said soy protein source is introduced.

8. The method defined in claim 6 in which the concentration of treating agent in said aqueous medium is no more than about $1.4 \times 10^{-3}$ M.

9. The method defined in claim 1 in which a source of defatted soy protein is dispersed in an aqueous alkaline medium for a period of time sufficient to extract protein from said protein source prior to contacting said protein with said treating agent.

10. The method defined in claim 9 in which said aqueous alkaline medium is at a pH of between 9.5–12.5 and a temperature of below about 100° F.

11. The method of claim 1 wherein after said contacting, said soy protein is contacted with a flavor-and-odor-improving agent selected from the group consisting of water-soluble aliphatic monohydroxy alcohol, aliphatic polyhydroxy alcohol, aliphatic ether, aliphatic ketone and mixtures thereof, in a concentration and for a time sufficient to substantially reduce the characteristic beany odor and flavor of said soy protein but insufficient to increase the viscosity of said soy protein to a level substantially in excess of said soy protein before said contacting with said viscosity-decreasing treating agent, and thereafter said soy protein and said improving agent are separated and said soy protein is recovered, said recovered soy protein having a high degree of solubility in water.

12. The method of claim 11 wherein said improving agent comprises ethanol.

13. The method of claim 11 wherein said improving agent comprises isopropanol.

14. The method of claim 11 wherein said improving agent comprises glycerol.

15. The method of claim 11 wherein said improving agent comprises methyl ethyl ether.

16. The method of claim 11 wherein said improving agent comprises diethyl ketone.

17. The edible soy protein produced by the process of claim 1.

18. The edible soy protein produced by the process of claim 11.

19. A method of improving the characteristics of soy protein, which method comprises contacting soy protein dispersed in an aqueous medium at about pH 8.5 and 170° F. with about $1.4 \times 10^{-3}$ M of chlorine for about 5 minutes, thereafter adjusting the pH to about 4.5 with hydrochloric acid, and centrifuging to separate the soy protein as precipitate, decanting the resulting supernatant and dispersing said soy protein precipitate in ethanol at about 70°–75° F., the ethanol being present in a concentration of about 25–90 percent, by volume, maintaining contact between the ethanol and soy protein for about 10 minutes and thereafter separately recovering the soy protein as a precipitate, whereby a soy protein isolate is provided having substantially reduced flavor and odor and a viscosity less than that of soy protein treated only by alkaline extraction, said soy protein isolate having substantially complete solubility in water.

* * * * *